United States Patent [19]

Gebhard et al.

[11] Patent Number: 4,763,911

[45] Date of Patent: Aug. 16, 1988

[54] FOLDABLE BABY CARRIAGE

[75] Inventors: Albert W. Gebhard, Denver; William G. Au, Northglenn; James S. Gregg; Robert M. Parker, both of Aurora, all of Colo.

[73] Assignee: Gerico, Inc., Denver, Colo.

[21] Appl. No.: 940,556

[22] Filed: Dec. 9, 1986

[51] Int. Cl.⁴ .............................................. B62B 11/00
[52] U.S. Cl. .......................................... 280/37; 74/96; 280/642; 297/17
[58] Field of Search .......................... 16/277, 289, 286; 297/16, 17, 53; 108/125; 74/96; 280/37, 642, 650, 647

[56] References Cited

U.S. PATENT DOCUMENTS

| | | | |
|---|---|---|---|
| 1,189,244 | 7/1916 | Erickson et al. | 280/37 |
| 1,348,723 | 8/1920 | Lester | 280/37 |
| 2,000,875 | 5/1935 | Bernon | 280/37 |
| 2,170,227 | 8/1939 | Weber | 280/37 |
| 2,429,763 | 10/1947 | Lindabury | 280/38 |
| 2,564,266 | 8/1951 | Linton | 280/37 |
| 3,679,223 | 7/1972 | Sakal | 280/37 |
| 4,062,555 | 12/1977 | Peng et al. | 280/42 |
| 4,216,974 | 8/1980 | Kassai et al. | 280/42 |
| 4,294,464 | 10/1981 | Ettridge | 280/650 X |

FOREIGN PATENT DOCUMENTS 238409  8/1925  United Kingdom .................. 280/37

Primary Examiner—John J. Love
Assistant Examiner—Michael Mar
Attorney, Agent, or Firm—Sheridan, Ross & McIntosh

[57] ABSTRACT

A foldable baby carriage is provided which is foldable to a compact, reduced volume configuration having a height and width essentially less than or equal to the height and width of the back member. In the folded configuration, two of the components, preferably the back member and rear wheels support, cooperate to form a shell which encloses the other two major components of the carriage, preferably the seat member and the front wheels support.

14 Claims, 6 Drawing Sheets

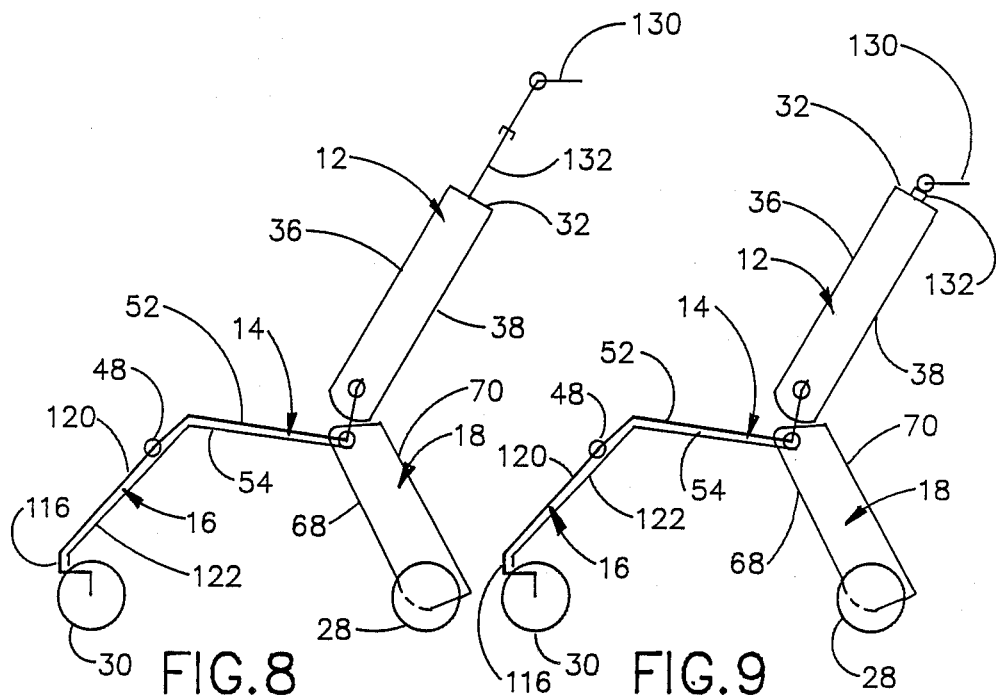
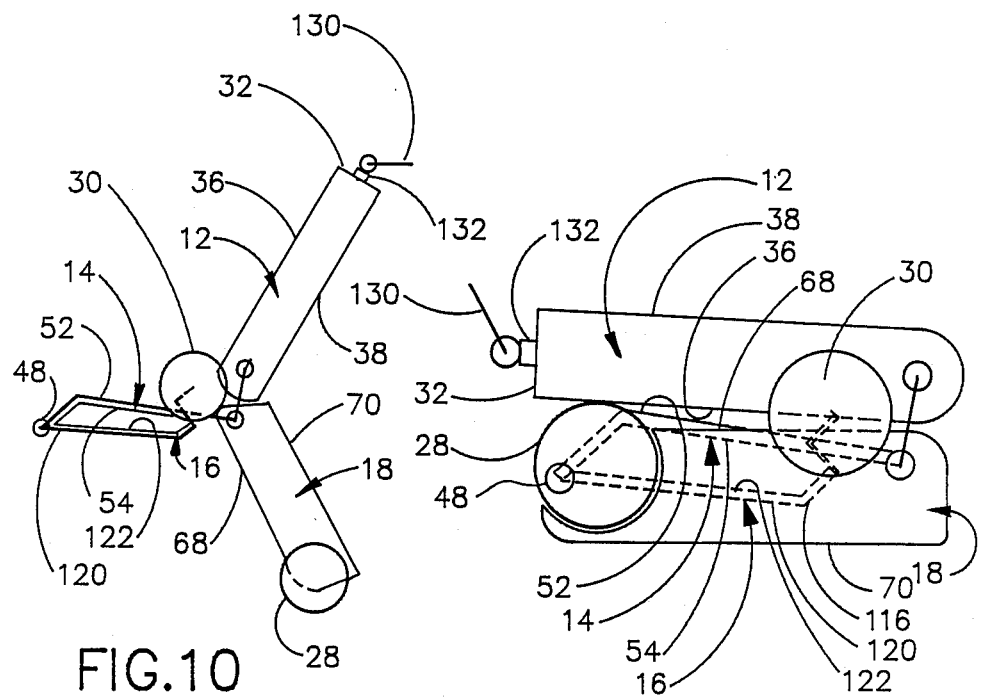

FOLDABLE BABY CARRIAGE

FIELD OF THE INVENTION

The present invention relates to a foldable baby carriage and, in particular, to a baby carriage which is foldable into a compact configuration of small width, height and thickness.

BACKGROUND INFORMATION

Baby carriages in their normal operative configurations are typically unwieldy and cumbersome to carry and occupy a large and irregular volume, making baby carriages in such a configuration troublesome to transport or store. A number of attempts have been made to provide a baby carriage which is collapsible to a reduced volume. U.S. Pat. No. 4,062,555, issued Dec. 13, 1977 to Peng, et al., discloses a foldable baby carriage having two sets of four-bar linkages and two sets of X-frames. U.S. Pat. No. 4,216,974, issued Aug. 12, 1980 to Kassai, et al., discloses a baby carriage with two hingeable link means to open and close the angle of intersection of the rear and front legs. U.S. Pat. No. 4,294,464, issued Oct. 13, 1981 to Ettridge, discloses a child's stroller with a pantograph linkage connecting upper and lower frames. U.S. Pat. No. 2,429,763 issued Oct. 28, 1947 discloses a baby carriage having wheels which fold into the plane of the supporting units and frame members.

These and other foldable baby carriages, while providing some reduction of volume occupied by the folded configuration compared to the volume occupied by the unfolded configuration, provide a folded configuration which is still unwieldy because of a relatively large extension in the height, width or thickness of the folded configuration. This extension in one or more of the height, width or thickness dimensions makes the folded carriage difficult to carry or move, difficult to place in another conveyance such as an aircraft or automobile, and difficult to store. Further, such folded baby carriages leave exposed a number of aspects of the folding mechanism such as joints, linkages, push rods, and the like. These exposed components further contribute to the difficulty of moving and storage because they can snag or become caught on other objects. Further, the exposed mechanisms or linkages can present some danger of injury, particularly to children. Also, a folded baby carriage with exposed linkages and other mechanisms presents a cluttered and unsightly appearance and leaves many of the linkages and mechanisms exposed to the elements which can lead to corrosion or deterioration thereof. Some of the foldable baby carriages previously described result in the wheels coming in contact with the seat or back support portion, which may be objectionable from the point of view of sanitation.

In view of the foregoing, a number of advantages could be achieved by a baby carriage wherein the carriage is foldable to a configuration which is not only reduced in volume but also has a small height, width and thickness. It is also advantageous to provide a baby carriage which can be folded to a configuration providing a shell structure enclosing the components of the baby carriage, and providing separation of the seat and back support from the wheels.

SUMMARY OF THE INVENTION

The baby carriage, according to the present invention, can be folded to a configuration having a width, a height and a thickness less than the width, height or thickness achieved by other folding devices. The baby carriage in the folded configuration comprises a shell which encloses substantially all parts of the frame, seat structure and linkages of the baby carriage. The stroller comprises at least a seat, a back, a forward wheels support and a rear wheels support. These four members are movably interconnected with each other. When the carriage is in a folded configuration, two of these members, such as the back and the rear wheels support, form a shell, i.e. a substantially box-shaped device having front and rear walls and, preferably, side walls, substantially enclosing all major parts of the carriage particularly the other two major components of the carriage, namely the seat and front wheels support. The folded carriage thus has a compact configuration with a width and height substantially no larger than the width and height of the back and a thickness which is less than either the width or height of the back. In order to provide a folded configuration with a small height, the top edge of the back is, in the folded configuration, substantially adjacent to the front edge of the seat. The handle of the baby carriage can be made to collapse so that the handle support rods are substantially enclosed in the shell, preferably leaving the handle itself exterior to the shell to assist in carrying the folded baby carriage.

BRIEF DESCRIPTION OF THE DRAWINGS

FIGS. 8-11 are diagrammatic views illustrating the various stages of folding the baby carriage, from a fully opened to a nearly fully closed configuration.

DETAILED DESCRIPTION OF THE PREFERRED EMBODIMENT

The present invention relates to a baby carriage which is foldable to a configuration having a width and height substantially equal to the width and height of the back member and a thickness less than either the width or height of the back member. The baby stroller, in its folded configuration, comprises a shell substantially enclosing all portions of the stroller except for the wheels, which are disposed externally to the shell in wheel wells, and a handle, for use in carrying the folded baby stroller.

Figures 1, 2:
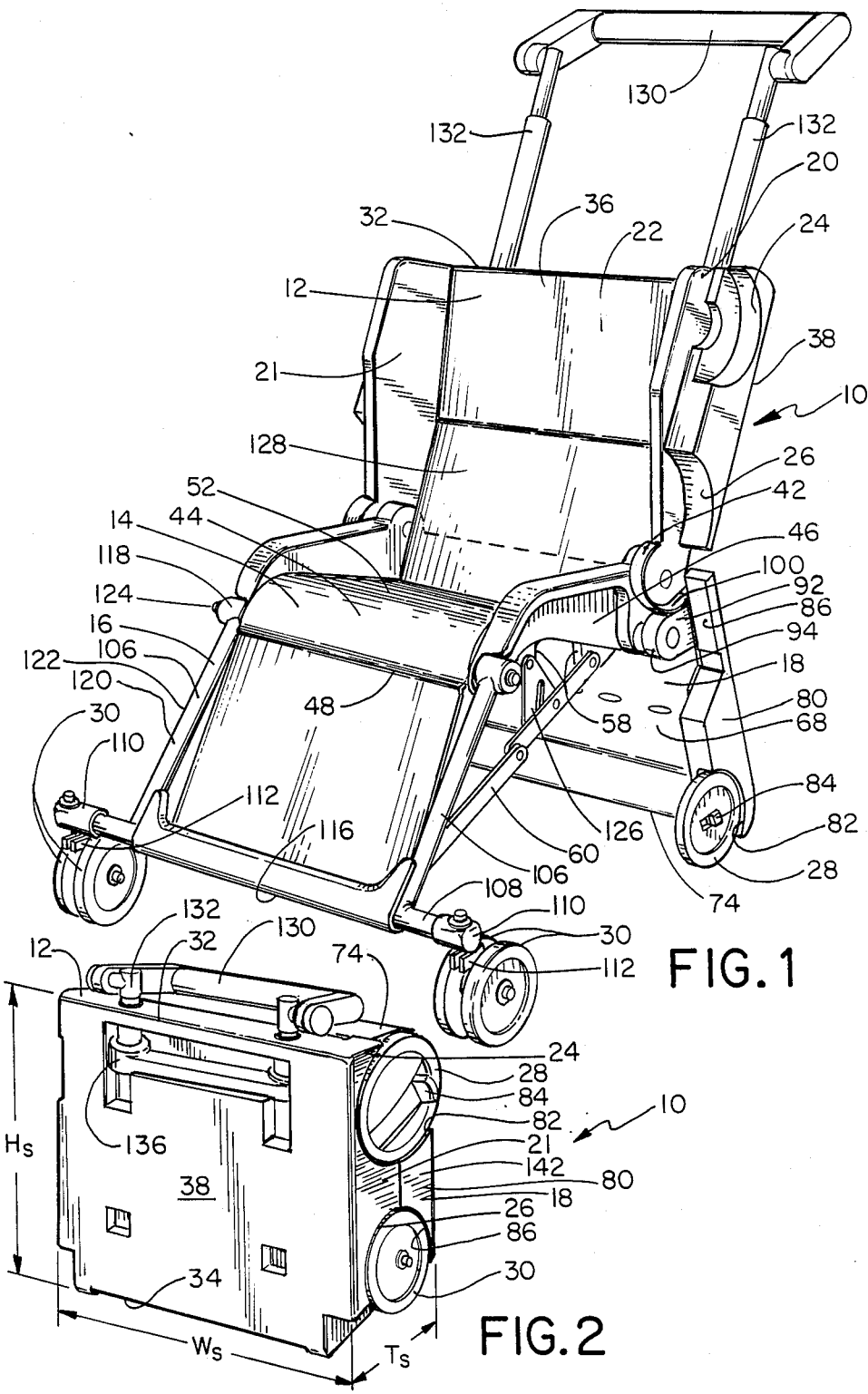
FIG. 1 is a perspective view of the foldable baby carriage in the unfolded configuration.
FIG. 2 is a perspective view of the baby carriage in the folded configuration.

Referring now to FIG. 1, the baby stroller 10 includes at least four members: a back 12, a seat 14, a front wheels support 16, and a rear wheels support 18. In the following, directional terms such as "upper", "lower", "forward" and "rear", unless otherwise indicated, are with reference to the perspective of one pushing the stroller. The back 12 seat 14 and rear wheels support 18 can be formed of any material having the necessary strength and rigidity and are preferably made of a durable, light-weight material such as a thermosetting plastic or a foamed plastic. The back 12, seat 14 and rear wheels support 18 can be reinforced with any of a number of reinforcing materials, reinforcing rods or bars. The back 12, seat 14, front wheels support 16, and rear wheels support 18 are movably interconnected, preferably in the manner discussed more fully below.

Figure 3:
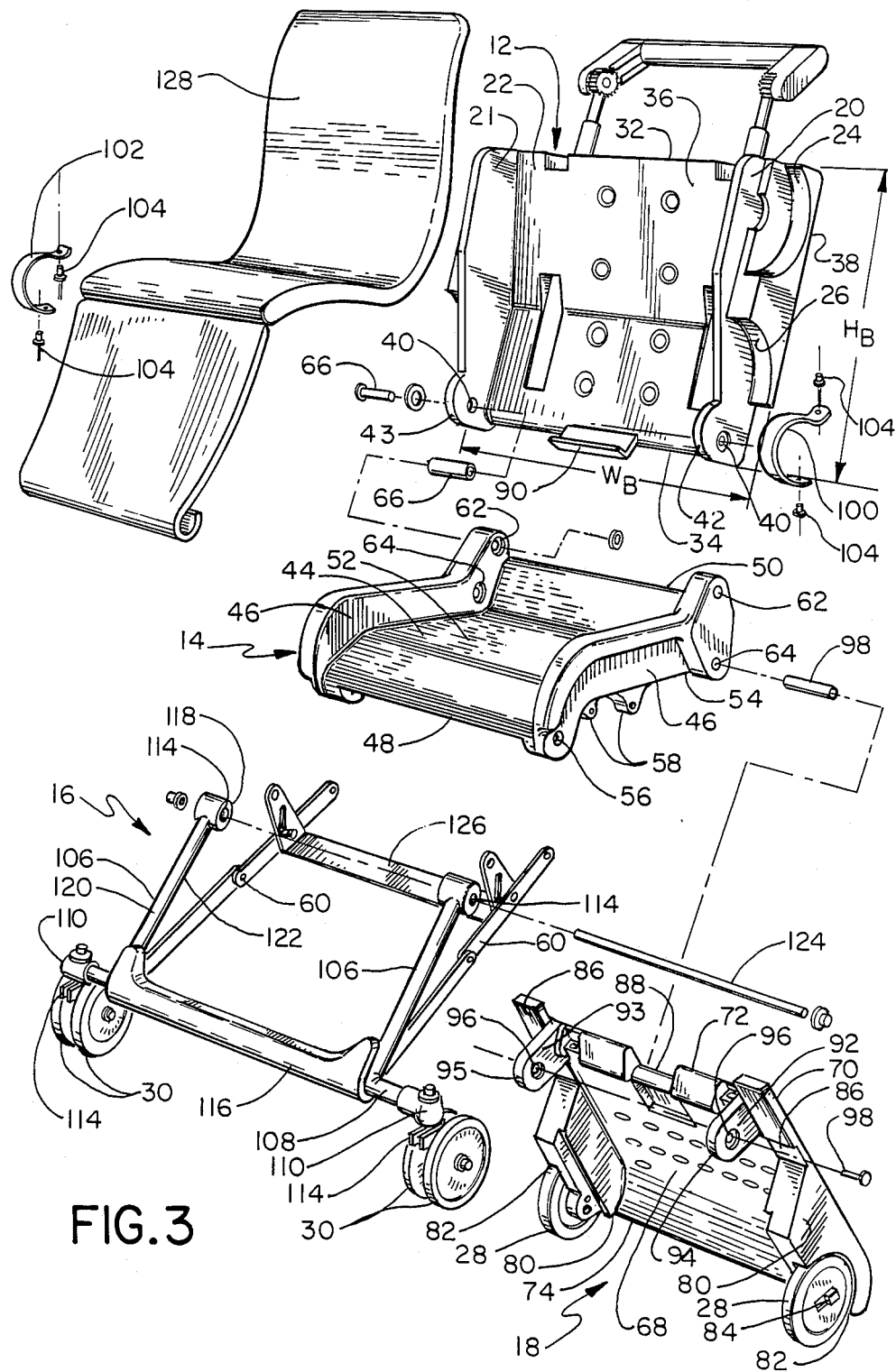
FIG. 3 is an exploded perspective view of the baby carriage.

Referring now to FIG. 3, the back 12 has a height $H_B$ and a width $W_B$. Left and right side walls 20, 21 extend forward from the back rest portion 22 of the back 12. Each of the side walls 20, 21 contains on its exterior surface upper and lower wheel wells 24, 26 for receiving portions of the rear and forward wheels 28, 30 respectively. The back 12 has an upper edge 32, a lower edge 34, a front surface 36 and a rear surface 38. Left and right holes 40 are formed in the left and right side walls 20, near the lower edge 34 of the back 12 to movably connect the back 12 to the seat 14 in a manner described below. The forward edges of the side walls 20, 21 are fashioned, in the region near the holes, 40, in the shape of flat-surfaced arcs 42, 43.

The seat member 14 comprises a substantially planar support portion 44 and left and right side walls 46 extending upward from the support portion 44 of the seat 14. The seat member 14 has a forward edge 48, a rear edge 50, an upper surface 52 and a lower surface 54. The seat member 14 has left and right forward holes 56 for connecting to the front wheels support 16 in a manner described below. On each side of the seat member 14 are two tabs 58 having holes for connecting to folding toggle struts 60 in a manner described below. The seat side walls 46 in the vicinity of the rear edge 50 are each provided with upper holes 62 and lower holes 64 for connecting the seat 14 to the back 12 and rear wheels support 18 respectively in a manner described below.

The seat 14 and back 12 are movably connected such as in a pivoting manner. Upper seat holes 62 are aligned with the back holes 40. The back 12 and seat 14 are pivotally connected with any conventional device, such as a rivet and bushing device 66.

The rear wheels support 18 comprises a substantially planar portion having a forward surface 68 and a rear surface 70. Rear wheels support 18 has an upper edge 72 and a lower edge 74. Left and right side walls 80 extend forward from the rear wheels support 18. Left and right wheel wells 82 are formed in the side walls to accommodate the wheels 28. The wheels 28 are attached to the side walls 82 using any standard axle apparatus. The wheels are preferably provided with a braking or locking mechanism 84 The side walls 80 are each provided with recessed areas 86 which form wheel wells for the forward wheels 30 when the stroller is in a folded configuration. The upper edge 72 of the rear wheels support 18 is provided with a notch 88 to accommodate a locking mechanism 90 which is attached to the back 12. Rear wheels support 18 is provided with left and right tabs 92, 93, each having an edge surface, at least a portion of which has an arcuate shape 94, 95. The tabs 92, 93 are each provided with a hole 96 for attachment to the seat member 14 in the following manner. The holes 92 are aligned with the lower seat holes 64. The rear wheels support 18 and seat 14 are pivotally connected with any conventional devices such as a rivet and bushing device 98.

As can be seen from the above description, when the back 12 and the rear wheels support 18 are attached to the seat 14 in the manner described, the attachment devices will permit the back 12 to pivot with respect to the seat 14 about a first axis defined by the centers of the aligned seat-back holes 62, 40. The rear wheels support 18 is permitted to pivot with respect to the seat 14 about a second axis defined by the seat-rear wheels support aligned holes 64, 96. To assist in coordinating the pivoting of the back 12 and rear wheels support 18, first and second flexible index straps 100, 102 are provided. The upper end of the first index strap 100 is attached to the upper surface of the arc portion 42 of the left side wall 20. The first index strap 100 lies partially adjacent to the flat arc portion 42 and partially adjacent to the edge surface of the left rear wheels support tab 92. The lower end of the first index strap 100 is attached to the upper portion of the edge of the left tab 92. Attachment of the index straps 100, 102 is accomplished by conventional attachment devices such as rivets 104.

The second index strap 102 is attached in a manner somewhat different from the manner of attachment of the first index strap 100. The upper end of the second index strap 102 is attached to the lower surface of the right arc portion 43. The lower end of the second index strap 102 is attached to the lower portion of the edge of the right tab 93.

The front wheels support 16, as depicted in FIG. 3, is in the form of a U-shaped framework comprising first and second front legs 106 joined to a rigid cross piece 108. Attached to each end of the cross piece 108 are caster mounts 110, carrying the front wheels 30. The casters 110 can also each be provided with a swivel lock 112 to prevent swiveling of the wheels 30 and force the wheels 30 into a forward alignment. The upper ends of the first and second front legs 106 have transverse holes 114 for attaching to the seat 14 in the manner described below. The front wheels support 16 has a lower edge 116 substantially defined by the cross piece 108, and an upper edge 118 substantially defined by the holes 114 and an imaginary line passing therethrough. The front wheels support 16 has a forward surface 120 defined by the forward surfaces of the legs 106 and a rear surface 122 defined by the rear surfaces of the legs 106.

Figure 5:
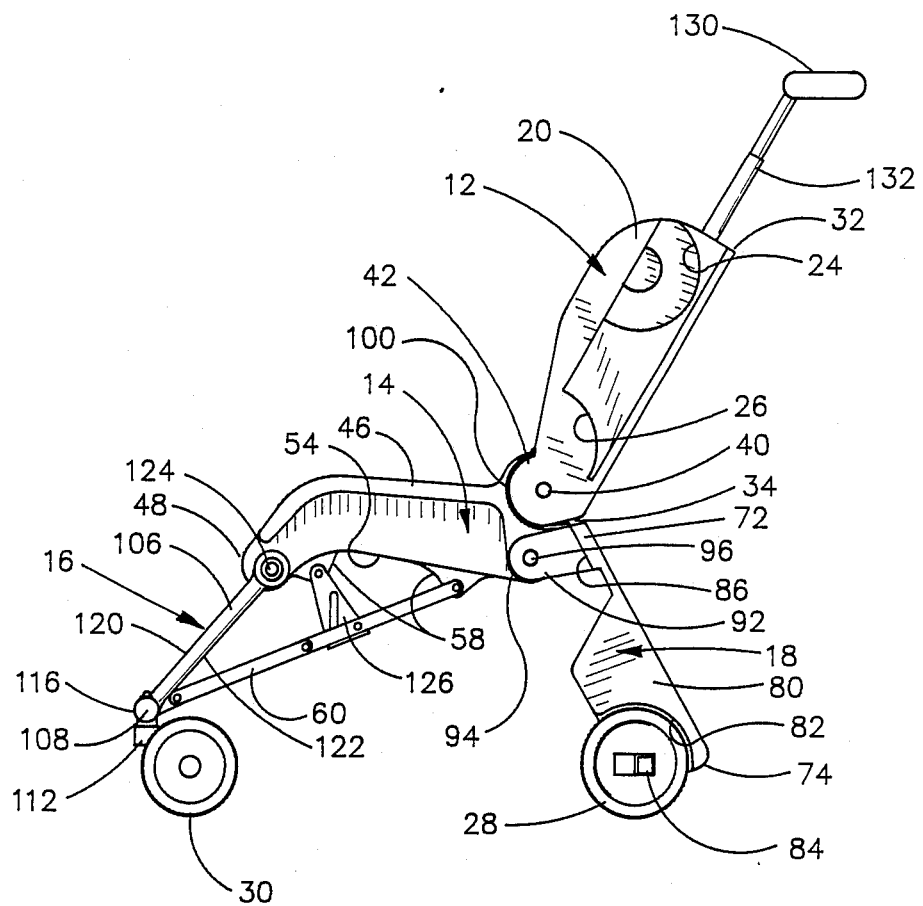
FIG. 5 is a side elevational view of the baby carriage in the unfolded configuration.
Figure 6:
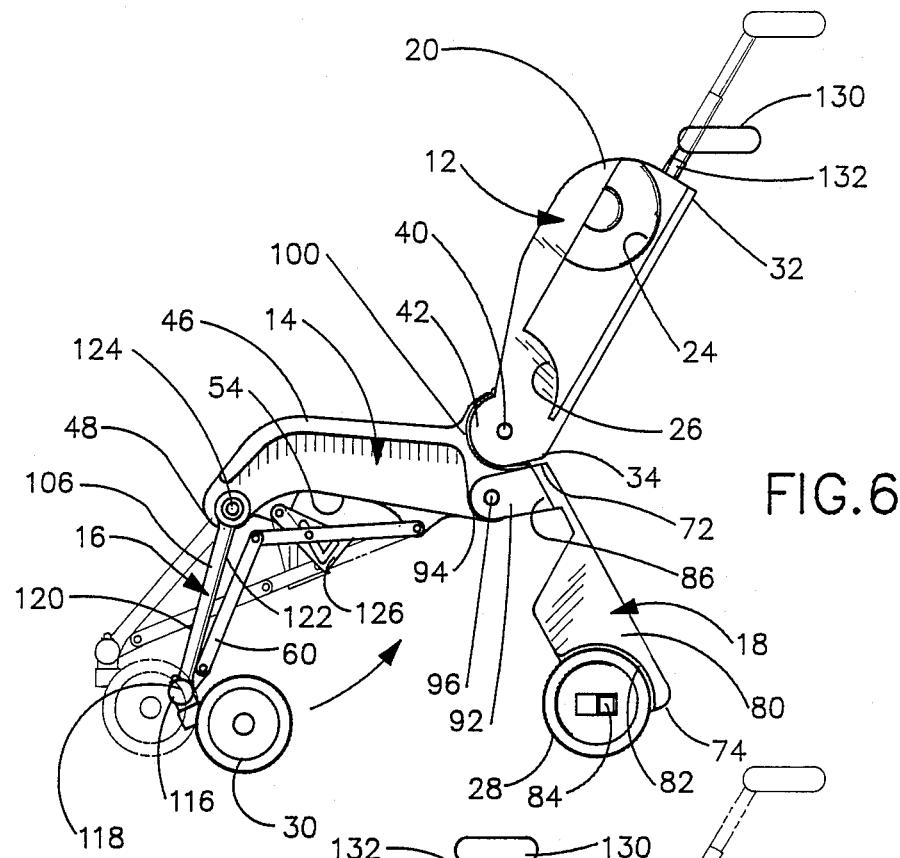
FIGS. 6-7 are side elevational views of the baby carriage in partly folded configurations, with the unfolded configuration shown in phantom lines.
Figure 7:
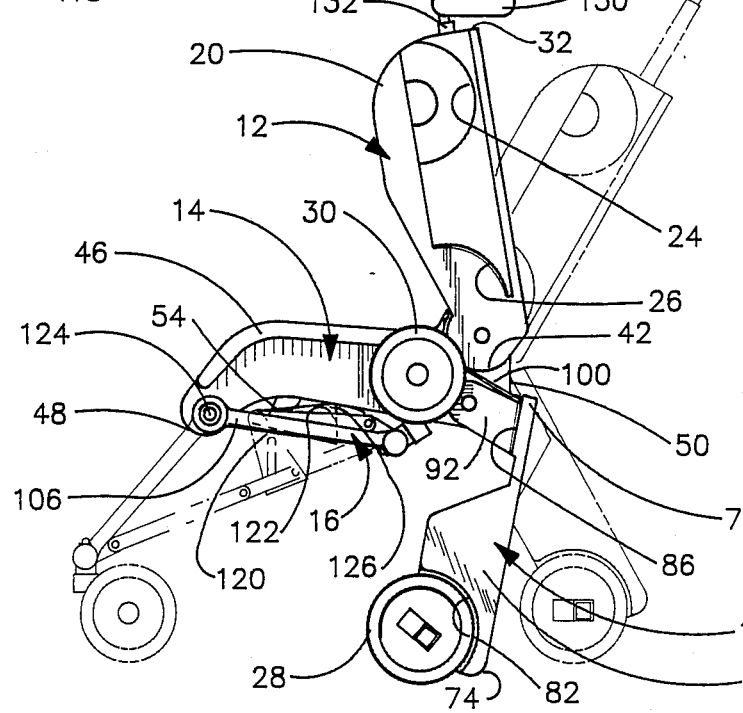

The front wheels support 16 is attached to the seat 14 in the following manner. The leg holes 114 are aligned with the seat forward holes 56. The front wheels support 16 and seat 14 are pivotally connected with any conventional device such as a rod 124. In order to stabilize the front wheels support in a desired unfolded position, as well as to permit and assist in moving the front wheels support to a desired folded position, toggle struts 60 are connected between the front wheels support 16 and the seat 14. The lower portion of the struts 60 are connected to the legs 106 pivotally, in a manner well known such as by rivets, as depicted in FIGS. 5 through 7. The struts 60 are slidably attached to a substantially U-shaped locking piece 126. The upper ends of the locking piece 126 and the upper ends of the struts 60 are pivotally connected to the seat tabs 58.

A pad 128 is placed adjacent to the back 12, seat 14, and front wheels support 16.

Figure 4:
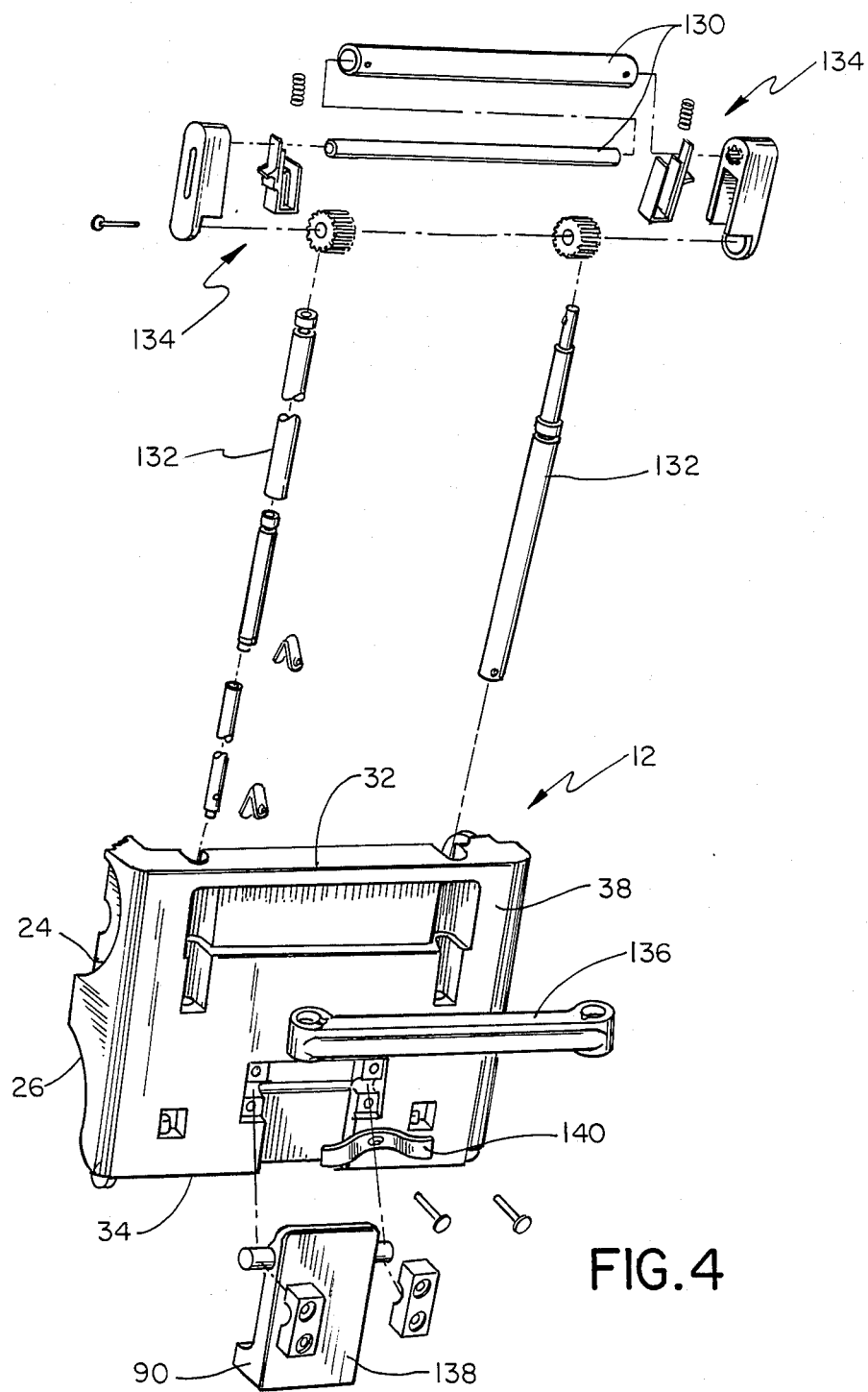
FIG. 4 is a partial exploded rear view of the baby carriage seat and handle.

Referring now to FIG. 4, a handle 130 a is attached at each of its ends to two telescoping support rods 132 The handle 130 is attached to the rods 132 by ratchet devices 134. A handle release bar 136 engages with the rods 132 to hold the rods 132 in their telescoped positions within the back member 12. A latch assembly 138, bearing the latch member 90 is pivotally mounted on the back 12, biased by a spring 140.

The manner of operation with regard to folding and unfolding the baby carriage of the present invention will now be described. Referring again to FIG. 5 the back 12 and seat 14 of the baby carriage is in the unfolded configuration forming a chair. To effect folding of the baby carriage, the handle 130 is moved downward towards the back member 12 as depicted in FIGS. 6 and 9 so that the support rods 132 substantially reside within the back member 12 and are retained therein by the handle release bar 136. The front wheels 30 are preferably locked in forward alignment by engaging the swivel locks 112. The latch 96 is disengaged from the rear wheels support 18 by grasping the latch assembly 138 and pivoting rearwardly. The lock piece 126 is pivoted forward to unlock the toggle struts 60. The struts 60 are kinked upward while the forward leg support 16 is pivoted rearward to move the front wheels support 16 towards the lower surface 54 of the seat 14. Simultaneously, the front wheels 30 are brought towards the upper recesses 86 of the rear wheels support 18, as best seen in FIG. 6. The described pivoting motion of the front wheels support 16 is continued until the rear surface 122 of the front wheels support 16 is substantially adjacent to the bottom surface 54 of the seat member 14 as best seen in FIGS. 7 and 10.

The back 12 and rear wheels support 18 are next brought into a substantially parallel configuration in the following manner. The back member 12 is pivoted forward about the first axis to move from the configuration depicted in FIG. 6 to the configuration depicted in FIG. 7. Simultaneously, the rear wheels support member 18 is pivoted towards the seat member 14 about the second axis to the configuration depicted in FIG. 7. Pivoting is continued until the fully folded configuration is achieved, depicted in FIG. 11, in which the top edge 32 of the back is substantially adjacent to the forward edge 48 of the seat 14, the seat upper surface 52 is substantially adjacent to the back forward surface 36, the front wheels support rear surface 122 is substantially adjacent to the seat lower surface 54 and the rear wheels support front surface is substantially parallel to the back forward surface 36 and is substantially adjacent to the forward wheel support forward surface 120. Pivoting of the back member 12 and rear wheels support 18 is coordinated because of the action of the index strap 100. As the rear wheels support 18 is pivoted from the position depicted in FIG. 6 to the position depicted in FIG. 7, the lower point of attachment of the first index strap 100 is moved away from the point of tangency of the index strap 100 with the side wall arcuate surface 42 causing the index strap 100 to exert a torque on the arcuate side wall portion 42. This torque results in pivoting of the back member 12 about the first axis.

The operation of the second index strap 102 in coordinating movement of the back 12 and rear wheels support 18 is substantially the same as the operation of the first index strap 100, except that in the unfolded configuration, the major part of the second index strap 102 is adjacent to the arcuate section 95 the right rear wheels support tab 93. As the back is pivoted from the position depicted in FIG. 6 to the position depicted in FIG. 7, the upper point of attachment of the second index strap 102 is moved away from the point of tangency of the second index strap 102 with the second tab 94, causing the second index strap 102 to exert a torque on the second tab arcuate portion 95. This torque results in pivoting the rear wheels support 18 about the second axis.

Pivoting of the back member 12 about the first axis and the rear wheels support 18 about the second axis towards the seat member 14 is continued until the back member 12 and rear wheels support 18 are in substantially parallel configuration as depicted in FIG. 2 to form a shell 142. In this configuration, the height of the shell $H_S$ is substantially equal to the height of the back $H_B$ and the width of the shell $W_S$ is substantially equal to the width of the back $W_B$. The thickness of the shell $T_S$ is less than either the shell height $H_S$ or the shell width $W_S$. In one embodiment, the shell height $H_S$ is less than about $13\frac{1}{2}$ inches, the shell width $W_S$ is less than about 18 inches, and the shell thickness $T_S$ is less than about $8\frac{1}{2}$ inches. The shell 142 formed by the conjunction of the seat member 14 and rear wheels support 18 substantially encloses the seat member 14, the front wheels support 16 and the toggle struts 60. The rear wheels 28 reside in wheel wells formed by the conjunction of the rear wheels support wheel wells 82 and the back member upper recesses 24. The forward wheels 30 reside in wheel wells formed by the conjunction of the rear wheels support upper recesses 86 and the back member lower recesses 26. The handle support rods 132 are substantially contained within the shell 142 and particularly, within the back member 12.

The manner in which the stroller is unfolded from the configuration depicted in FIGS. 2 and 11 to the operative configuration depicted in FIGS. 1 and 5 is substantially the reverse of the folding steps. The latching assembly 138 is moved to disengage the latch 90 from the rear wheels support 18. The back member 12 and rear wheels support 18 are pivoted away from the seat member 14 about the first and second axes respectively to assume the position depicted in FIG. 7. Simultaneous pivoting of the back member 12 and rear wheels support 18 is effected by movement of the index straps 100, 102 in the reverse manner to that described above. Pivoting of the back member 12 and rear wheels support 18 is continued until the back member 12 and rear wheels support 18 assume the configuration depicted in FIG. 10, at which time the latch 90 engages the locking recess area 88 of the rear wheels support 18 to hold the rear wheels support rigidly in the desired operative position depicted in FIG. 1. The front wheels support 16 is then pivoted away from the lower surface 54 of the seat member 14 to assume the configuration depicted in FIG. 6. Pivoting is continued until the front wheels support 16 reaches the operative configuration depicted in FIGS. 1 and 5, at which time the toggle struts 60 are in substantially linear locking configuration as depicted in FIG. 9. The handle release bar 136 is pulled outward to permit extension of the telescoping handle support rods 132 to assume the extended configuration depicted in FIGS. 5 and 8.

A number of variations on the described preferred embodiment can be used. Components of the baby carriage can be moved relative to one another by mechanisms other than pivoting mechanisms. The shell of the folded configuration can be formed by other members of the baby carriage, such as the seat or front wheels support. The shell can be configured so as to not form a complete enclosure, such as by deleting one or more of the side walls. The wheels can be stored internally to the shell, or can be stored externally in other than wheel wells. Latching can be accomplished by other latching mechanisms than those described or latching can be deleted. Devices for coordinating and guiding movement of parts of the baby carriage can be provided by mechanisms other than the toggle struts and index straps described, or can be used to interconnect other parts of the baby carriage than the described interconnected members, or can be deleted. The handle can be moved by other than the telescoping and locking mechanism described or can be deleted. The front wheels support described as an open framework device can also be provided as a solid piece. The seat, back, and/or rear wheels support can be provided in a framework configuration rather than as solid pieces. The baby carriage can be provided with lateral collapsable mechanisms in addition to the described folding mechanisms.

Based on the foregoing detailed description of the present invention, a number of advantages of the invention are easily seen. The baby stroller can be folded to a compact configuration with a height and width substantially less than the height and width of the unfolded carriage, and preferably with a height, width and thickness so as to permit easy storage, and particularly, to permit storage under a seat such as an airliner seat. The folded baby carriage is in the form of a shell substantially enclosing all other major parts of the baby carriage to reduce or eliminate the possibility of snagging from protrusions or linkages or the possibility of injury from contact with or operation of linkages, hinges and the like. The shell enclosure hides the unsightly appearance of internal linkages and mechanisms.

Although the present invention has been described with reference to certain embodiments, it should be appreciated that further modifications can be effected within the spirit and scope of the invention.

What is claimed is:

1. A foldable, wheeled baby stroller which is operable as a baby stroller when in an unfolded configuration and which forms a substantially enclosing shell when folded, comprising:
   at least four movably interconnected members consisting of a seat, a back having a width and height, a front wheel support and a rear wheel support, wherein when said four members are moved to a first folded configuration, said back, which includes a first portion of a shell, and one of said front wheel support and said rear wheel support, one of which includes a second portion of a shell, form opposing sides of a shell having a width, a height, and a thickness substantially enclosing said seat and the other one of said front and said rear wheel supports, and wherein when said four members are moved to a second unfolded configuration, said back and said seat form a chair.

2. A baby stroller, as claimed in claim 1, wherein:
   said back and said rear wheel support form said shell.

3. A baby stroller, as claimed in claim 1, wherein:
   said back and said seat are pivotally connected to permit movement with respect to each other about a first axis; and
   said seat and said rear wheel support are pivotally connected to permit movement with respect to each other about a second axis.

4. A baby stroller, as claimed in claim 3, wherein:
   said seat is pivotally connected to said front wheel support along a third axis.

5. A baby stroller, as claimed in claim 1, wherein:
   at least one of said back, said front wheel support and said rear wheel support has at least one recess means for holding a portion of a wheel of said stroller when said stroller is in said first folded configuration.

6. A baby stroller, as claimed in claim 1, further comprising:
   a handle connected to at least one support rod, said support rod being movable between at least a first and a second position, said support rod being substantially enclosed by said shell when said support rod is in said first position and said four members are in said first folded configuration.

7. A baby stroller, as claimed in claim 1, wherein:
   said shell height is substantially equal to said back height and said shell width is substantially equal to said back width.

8. A baby stroller, as claimed in claim 1, wherein said shell height is less than about 13½ inches.

9. A baby stroller, as claimed in claim 1, wherein said shell width is less than about 18 inches.

10. A baby stroller, as claimed in claim 1, wherein said shell thickness is less than about 8½ inches.

11. A foldable baby carriage which is operable as a baby carriage when in an unfolded configuration and which forms a substantially enclosing shell when folded, comprising:
    a seat having a seat support portion and a lower surface;
    a back having a back rest portion and an upper edge and which includes a first portion of a shell;
    a front wheel support having at least a front wheel attached thereto;
    a rear wheel support having a forward surface and at least one rear wheel attached thereto and which includes a second portion of a shell;
    at least one sidewall attached to at least one of said back, said front wheel support and said rear wheel support;
    first means for connecting said back to at least one of said seat, said front wheel support and said back wheel support wherein said back is movable with respect to said seat to a folded position wherein said back upper edge is substantially adjacent to said seat;
    second means for connecting said front wheel support to at least one of said seat, said back and said rear wheel support wherein said front wheel support is movable with respect to said seat to a folded position wherein said front wheel is substantially adjacent to said seat; and
    third means for connecting said rear wheel support to at least one of said seat, said back and said front wheel support wherein said rear wheel support is movable with respect to said seat to a folded position wherein said rear wheel is substantially adjacent to said seat and wherein when said back and said front wheel support are in said folded position, said front wheel support is disposed between said lower surface of said seat and said forward surface of said rear wheel support, and said first shell portion and said second shell portion together form a substantially enclosing shell.

12. A foldable baby carriage which is operable as a baby carriage when in an unfolded configuration and which forms a substantially enclosing shell when folded, comprising:
    a back having a forward and a rearward surface and an upper and a lower edge and which includes a first portion of a shell;
    a seat having upper and lower surfaces and forward and rearward edges;
    means for movably connecting said seat to said back forming a seat-back combination to permit movement of said seat from an unfolded position wherein said seat upper surface is positioned with respect to said back forward surface to form a chair, to a folded position in which said seat upper surface is substantially parallel with and adjacent to said back forward surface;

a front wheel support having forward and rearward surfaces and upper and lower edges and having at least one front wheel rotatably connected thereto;

means for movably connecting said front wheel support to said seat to permit movement of said front wheel support from an unfolded position in which said front wheel support rearward surface is disposed substantially at an angle to said seat lower surface to a folded position in which said front wheel support is disposed between and is substantially parallel with said seat lower surface and a forward surface of a rear wheel support;

a rear wheel support having forward and rearward surfaces and upper and lower edges, and having at least one rear wheel rotatably mounted thereon and which includes a second portion of a shell;

means for movably connecting said rear wheel support to said seat-back combination to permit movement of said rear wheel support from an unfolded position in which said rear wheel support forward surface is disposed substantially at an angle to said seat lower surface to a folded position in which said rear wheel support forward surface is substantially parallel to said back forward surface and said rear wheel support forward surface is substantially adjacent to said front wheel support forward surface and said upper edge of said back is substantially adjacent to said forward edge of said seat and wherein said first portion of a shell of said back and said rear second portion of a shell of said wheel support together form a substantially enclosing shell when said front wheel support and said seat are in said folded position.

13. A baby carriage, as claimed in claim 12, wherein:

said front wheel is connected adjacent to said front wheel support lower edge wherein when said front wheel support is in said folded position, said front wheel is substantially adjacent to said lower edge of said back; and said rear wheel is connected adjacent to said rear wheel support lower edge wherein when such rear wheel support is in said folded position, said rear wheel is substantially adjacent to said upper edge of said back.

14. A foldable wheeled baby stroller comprising:

a seat;

a back connected to said seat so as to pivot with respect to said seat about a first axis in a first direction when said stroller is folded and in a second direction when said stroller is unfolded;

a rear wheel support connected to said seat so as to pivot with respect to said seat about a second axis in a first direction when said stroller is folded and in a second direction when said stroller is unfolded;

a first flexible strap means for:
 (a) pivoting said back about said first axis in said first direction when said rear wheel support is pivoted in said first direction; and
 (b) pivoting said rear wheel support about said second axis in said second direction when said back is pivoted in said second direction; and a second flexible strap means for:
 (a) pivoting said back about said first axis in said second direction when said rear wheel support is pivoted in said second direction; and
 (b) pivoting said rear wheel support about said second axis in said first direction when said back is pivoted in said first direction.

* * * * *